(12) United States Patent
Grau

(10) Patent No.: US 7,209,136 B2
(45) Date of Patent: Apr. 24, 2007

(54) METHOD AND SYSTEM FOR PROVIDING A VOLUMETRIC REPRESENTATION OF A THREE-DIMENSIONAL OBJECT

(75) Inventor: Oliver Grau, Leatherhead (GB)

(73) Assignee: British Broadcasting Corporation, London (GB)

( * ) Notice: Subject to any disclaimer, the term of this patent is extended or adjusted under 35 U.S.C. 154(b) by 426 days.

(21) Appl. No.: 10/773,042

(22) Filed: Feb. 4, 2004

(65) Prior Publication Data

US 2005/0035961 A1 Feb. 17, 2005

(30) Foreign Application Priority Data

Feb. 4, 2003 (GB) ................. 0302561.6

(51) Int. Cl.
*G06T 15/00* (2006.01)
(52) U.S. Cl. ..................... 345/419
(58) Field of Classification Search ............. None
See application file for complete search history.

(56) References Cited

U.S. PATENT DOCUMENTS

| | | | |
|---|---|---|---|
| 4,710,876 A | 12/1987 | Cline et al. | |
| 4,885,688 A | 12/1989 | Crawford | |
| 5,101,475 A * | 3/1992 | Kaufman et al. | 345/424 |
| 5,442,733 A * | 8/1995 | Kaufman et al. | 345/424 |
| 5,548,694 A * | 8/1996 | Frisken Gibson | 345/424 |
| 6,400,362 B1 * | 6/2002 | Uchiyama et al. | 345/420 |
| 6,674,430 B1 * | 1/2004 | Kaufman et al. | 345/419 |
| 6,982,710 B2 * | 1/2006 | Salomie | 345/420 |
| 2003/0151604 A1 * | 8/2003 | Kaufman et al. | 345/419 |

FOREIGN PATENT DOCUMENTS

GB 2321814 8/1998

(Continued)

OTHER PUBLICATIONS

Dyer, Charles R., "Volumetric Scene Reconstructions from Multiple Views", *Foundations of Image Understanding*, L.S. Davis, Ed. , Kluwer, Boston, (2001), pp. 469-489.
Hilton, A , et al., "Marching Triangles: Range Image Fusion for Complex Object Modelling", *IEEE 1996 International Conference on Image Processing*.

(Continued)

*Primary Examiner*—Mark Zimmerman
*Assistant Examiner*—Enrique L. Santiago
(74) *Attorney, Agent, or Firm*—Blakely, Sokoloff, Taylor & Zafman, LLP

(57) ABSTRACT

The invention provides a method of providing a volumetric representation of a three-dimensional object. The method comprises several steps, including obtaining a line list of points of at least one set of lines having start and end points corresponding to intersection of the lines with object boundary positions and obtaining an approximate volumetric representation of the object. Then, a modified volumetric representation is produced by modifying the approximate volumetric representation based on the start and end points of the set of lines and the approximate volumetric representation. The resultant modified volumetric representation of the object is more accurate than the approximate volumetric representation of the object. Also, a resultant data set from the present invention that defines the volumetric representation of the object contains continuous data as to the shape of the object, rather than mere discrete data. Therefore, the resultant data set contains more realistic data defining the object.

26 Claims, 8 Drawing Sheets

FOREIGN PATENT DOCUMENTS

| | | |
|---|---|---|
| GB | 2325807 | 12/1998 |
| WO | WO-0233661 | 4/2002 |

OTHER PUBLICATIONS

Lorensen, William E., et al., "Marching Cubes: A High Resolution 3D Surface Construction Algorithm", *Proceedings of the 14th Annual Conference on Computer Graphics and Interactive Techniques, ACM Press*, (1987),pp. 163-169.

Martin, W , et al., "Volumetric Descriptions of Objects from Multiple Views", *IEEE Transactions on Pattern Analysis and Machine Intelligence*, vol. 5, No. 2, (Mar. 1983),pp. 150-158.

Potmesil, M , "Generating Octree Models of 3D Objects from their Silhouettes in a Sequence of Images", *Computer Vision, Graphics and Image Processing*, vol. 40, (1987),pp. 1-29.

Szeliski, Richard , "Rapid Octree Constructions from Image Sequences", *CVGIP: Image Understanding*, vol. 58, No. 1, (Jul. 1993),pp. 23-32.

Niem, Wolfgang , "Robust and Fast Modelling of 3D Natural Objects from Multiple Views", *SPIE Proceedings, Image and Video Processing II*, San Jose, vol. 2182, (Feb. 1994),pp. 388-397.

* cited by examiner

METHOD AND SYSTEM FOR PROVIDING A VOLUMETRIC REPRESENTATION OF A THREE-DIMENSIONAL OBJECT The present patent application claims the priority benefit of the filing date of European Application (EPO) No. 0302561.6 filed Feb. 4, 2003, which is incorporated herein by reference.

BACKGROUND OF THE INVENTION

The present invention relates to methods and systems for providing three-dimensional representations and will be described below with reference to this application. However, it will be appreciated that the invention is not limited to this particular field of use.

Several methods for providing volumetric representations of three-dimensional objects are known in the art. An example of a method for providing volumetric representations of three-dimensional objects includes providing a three-dimensional (3D) shape reconstruction of objects from multiple views. The computation of the visual hull from object silhouettes is a popular technique.

The method, also called shape-from-silhouette, delivers a 3D description of the object. The approach requires a set of silhouette images from calibrated cameras. A silhouette image is a binary (or in some cases, grey scale) image where each pixel indicates whether this pixel belongs to the object or not. The silhouette information can be determined by any suitable segmentation process. This is advantageously done using chroma-keying or difference-keying as described in our GB-0220972.4 and our earlier applications referred therein.

The 3D shape reconstruction can be formulated as the intersection of generalised cones of the silhouette images. A generalised cone is the union of visual rays from all silhouette points of a particular image. This intersection gives only an approximation of the real object shape and is called the visual hull. In particular concavities cannot be modeled with this method.

Several algorithms have been published for the computation of the visual hull, for example: W. Martin and J. K. Aggarwal, "Volumetric descriptions of objects from multiple views," IEEE Transactions on Pattern Analysis and Machine Intelligence, vol. 5, no. 2, pp. 150–158, March 1983; M. Potmesil, "Generating octree models of 3D objects from their silhouettes in a sequence of images," Computer Vision, Graphics and Image Processing, vol. 40, pp. 1–29, 1987; Richard Szeliski, "Rapid octree construction from image sequences," CVGIP: Image Understanding, vol. 58, no. 1, pp. 23–32, July 1993; and Wolfgang Niem, "Robust and fast modeling of 3d natural objects from multiple views," in SPIE Proceedings, Image and Video Processing II, San Jose, February 1994, vol. 2182, pp. 388–397. These approaches attempt to solve the problem in a volumetric space representation. The most common of these representations is to subdivide a 3D box in euclidian 3-space into a set of voxels of discrete size. The size of the box is predetermined such that the object can fit inside. In order to save memory these may be represented as "octrees" or are run-length encoded.

For the use of the 3D reconstruction, e.g. in a computer graphic application, a surface description, usually a polygonal mesh has to be generated. An often used algorithm is the marching cubes algorithm, described in U.S. Pat. Nos. 4,710,876 and 4,885,688, which creates an iso-surface of a volumetric data set. Since the mentioned shape-from-silhouette methods compute binary voxels the 3D surfaces generated from those using the marching cube algorithm are very noisy. This noise is introduced due to spatial discretisation of the volumetric representations. That is to say, real data as the actual shape of the object is lost during the processing of the algorithm.

BRIEF SUMMARY OF THE INVENTION

According to one aspect of the invention there is provided a method of providing a volumetric representation of a three-dimensional object, the method comprising:

obtaining a line list of points of at least one set of lines having start and end points corresponding to intersection of the lines with object boundary positions;

obtaining an approximate volumetric representation of the object; and producing a modified volumetric representation by modifying the approximate volumetric representation based on the start and end points of the set of lines and the approximate volumetric representation.

The resultant modified volumetric representation of the object is more accurate than the approximate volumetric representation of the object. Also, a resultant data set from the present invention that defines the volumetric representation of the object contains continuous data as to the shape of the object, rather than mere discrete data. Therefore, the resultant data set contains more realistic data defining the object.

Optionally, at least two two-dimensional images of the object are obtained and the object boundary positions are defined by edges of the object in the at least two two-dimensional images. The two-dimensional images provide a straightforward medium with which to define the object edges.

Optionally, the at least one set of lines is projected into at least one of the images to determine which of the lines intersect the edges. Optionally, the line list of points is determined by the points where the lines intersection the edges, and the points are start and end points of line segments of the lines that intersect the edges. Thus, the data set of the line list of points is relatively small, compared with a complete data set of points defining the object in its entirety.

Optionally, the approximate volumetric representation is obtained by projecting the at least two images of the object into an array of voxels, determining in which of the voxel(s) one or more of the edge(s) of the object intersects therewith, and producing a voxel list thereof. Optionally, the line list(s) are used to determine at least some locations on voxel edges of respective voxels in the voxel list to produce a voxel edge intersection list, and the voxel edge intersection list is used to produce the modified volumetric representation. Also optionally, the start and end points of the line segments are used to determine at least some locations on voxel edges of respective voxels in the voxel list to produce a voxel edge intersection list, and the voxel edge intersection list is used to produce the modified volumetric representation. Data for the modified volumetric representation may therefore be produced relatively efficiently.

Optionally, the modified volumetric representation is produced to have at least some voxel edges which more accurately match object edges than in the approximate representation.

Optionally, the approximate volumetric representation is obtained using a marching cubes procedure. Also optionally, the start and end points are used to modify the spatial positions of triangle vertices of triangles produced by the marching cubes procedure on the triangle vertices' respective voxel edges. Whereas the marching cubes procedure is efficient, the ability of the invention to modify the spatial positions of the triangle vertices allows for a comparatively more accurate representation of the object to be achieved. Also, whereas the data produced from the marching cubes procedure is discrete, data from the present invention is continuous, and therefore information regarding the object is not lost by comparison.

Optionally, the images are produced by a chroma-key process. In one embodiment, the images are binary images. Optionally, initial images are obtained by at least one camera for conversion to the images. Also optionally, the initial images are obtained using a plurality of said cameras in a studio, and the studio includes a retro-reflective background behind the object. The chroma-key process allows for ease of producing an image for use with the present invention.

Optionally, the start and end points and the position and direction of the lines are estimated with respect to a position of the camera when obtaining the images. Therefore, provided the location of each camera is known, it is not necessary for the cameras to be in the same position each time a volumetric representation is required.

In an alternative embodiment, there are 3 pairs of images, wherein the images of each pair lie in a parallel plane, and the plane of each respective image of each pair is normal to the planes of the remaining pairs.

Optionally a texture map is applied to the volumetric representation.

According to a second aspect of the present invention there is provided a method for providing a moving volumetric representation of an object, the method comprising obtaining a plurality of volumetric representations of a three-dimensional object using the method of any one of the preceding claims, where each volumetric representation represents a different phase of movement of the object over time, and consecutively displaying each volumetric representation in a manner to produce to a viewer the sensation that the volumetric representation of the object is moving.

According to a third aspect of the present invention there is provided a system for providing a volumetric representation of a three dimensional object, the system comprising:

means for obtaining a line list of points of at least one set of lines having start and end points corresponding to intersection of the lines with object boundary positions;

means for storing the line list of points; and means for obtaining an approximate volumetric representation of the object;

means for producing a modified volumetric representation based on the start and end points of the set of lines.

Optionally the system includes means for obtaining at least two two-dimensional images of the object and the object boundary positions are defined by edges of the object in the at least two two-dimensional images.

Optionally the system includes means for projecting the at least one set of lines into at least one of the images to determine which of the lines intersect the edges.

Optionally, the means for obtaining is at least one camera. Optionally the system comprises means for receiving a plurality of measures of positions of the at least one camera. Optionally, the system comprises means for storing the plurality of measures of camera positions.

An advantage of the present invention over the prior art is that it results in an ordered list stored over a 2D grid, and so simplifies processing in obtaining the volumetric representation of the object.

According to a fourth aspect of the invention there is provided a method of providing a volumetric representation of a three-dimensional object, the method comprising:

Obtaining a line list of points of at least one set of lines having start and end points corresponding to intersection of the lines with object boundary positions; and Producing the volumetric representation by correlating the start and end points of the set of lines to produce a continuous representation of the object.

Optionally, correlating the start and end points comprises searching for neighboring points. Optionally, sets of at least three neighboring points are correlated to form sets of triangles.

Optionally, lines are arranged over at least one two dimensional grid and at least some points are correlated by performing a search for neighboring points over the at least one two dimensional grid.

According to another aspect of the present invention there is provided a computer program or computer program product for providing a volumetric representation of a three-dimensional object comprising means for performing the method steps of either of the method aspects.

As will be appreciated by the person skilled in the art, a voxel is usually defined along orthogonal axes, typically of a cube, however it will be appreciated that for different applications of the invention, the voxels used may be of one or more different shapes, such as rectangular prism, tetrahedron, rhomboid, or of other three-dimensional polyhedron that are able to be part of an array where adjacent shapes share adjoining edges. For the purposes of the specification, unless otherwise defined, the term voxel therefore, is not to be limited to any particular shape.

BRIEF DESCRIPTION OF THE DRAWINGS

Illustrative embodiments of the invention will now be described, by way of example only, with reference to the accompanying drawings.

DETAILED DESCRIPTION OF EMBODIMENTS

Referring to FIGS. 1 to 7, 8b and 10, a first embodiment of the present invention comprises a method of providing a volumetric representation of a three-dimensional object 20.

Figure 1:
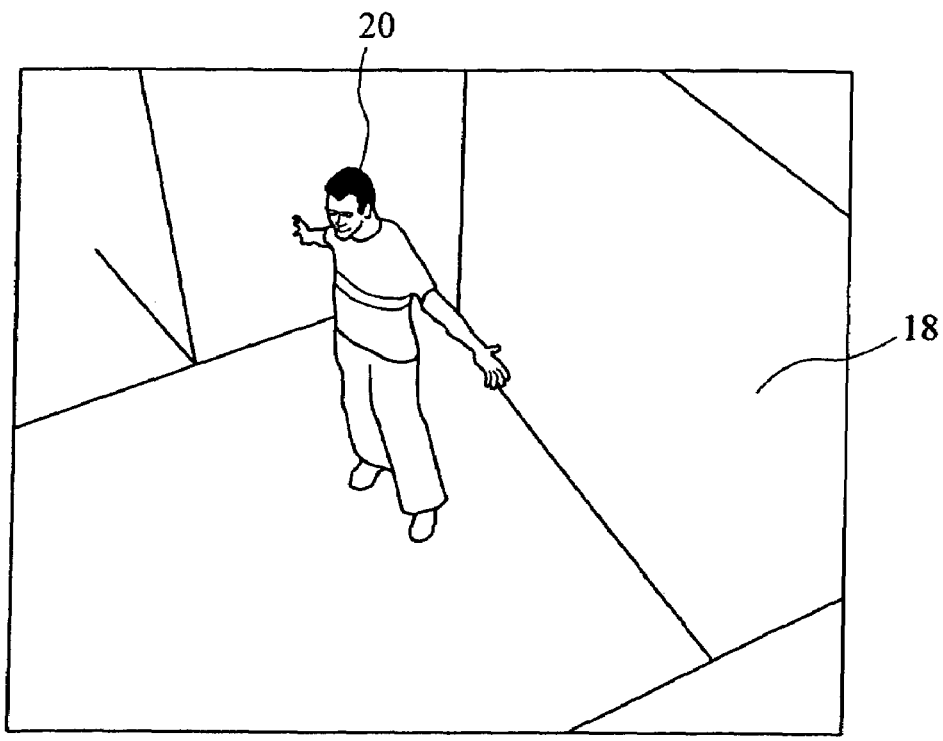
FIG. 1 is a perspective view of a person posing for a prior art chroma-key image process used with the present invention.

In FIG. 1, an example of a person is given for the object 20. Of course, the object is not limited to people, but can be any object within reason.

Figure 2:
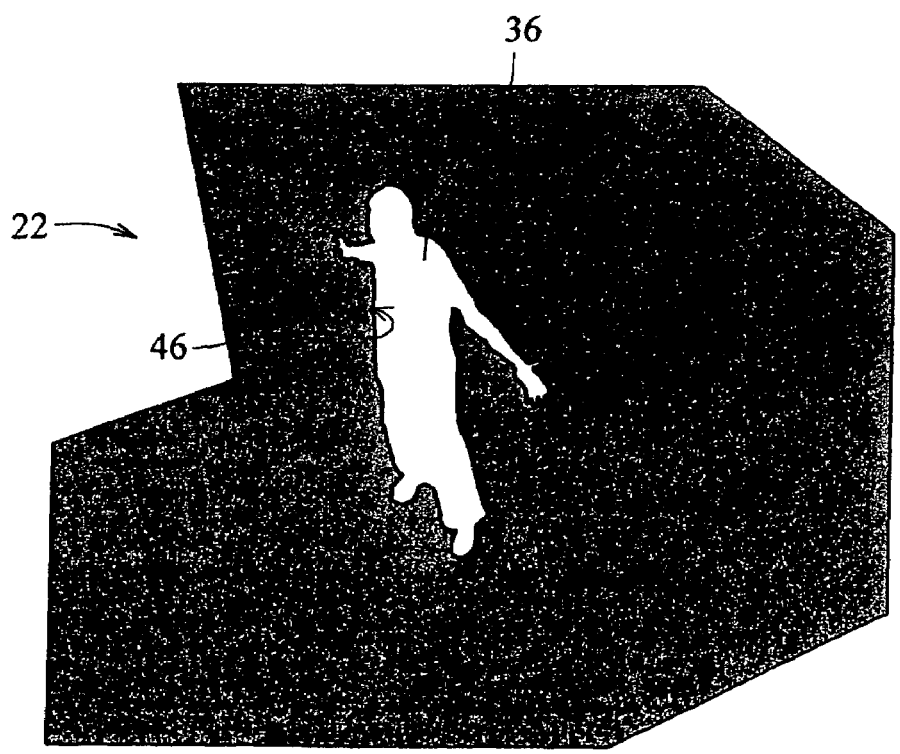
FIG. 2 is the chroma-key image resulting from the process involved in FIG. 1.

The method comprises several steps. The first step includes obtaining two dimensional (2D) binary, or silhouette images 22 of the object 20, using a camera & conventional chroma-keying techniques. In one embodiment, this is achieved using a multi-camera studio system with known camera parameters, as described in our GB application no. 0220972.4. For example, FIG. 2 illustrates a chroma-key representation of one view of the object 20 in front of a retro-reflective background 18 illustrated in FIG. 1. In practice, six images of the object are optionally obtained from the chroma-keying, where the six images represent different side views of the object. However in alternative embodiments, the method may rely on two to five images, or more than six.

A technique such as shape from silhouette, as described in "W. Niem, 'Robust and fast modeling of 3D natural objects from multiple views', SPIE Proceedings, Image and Video Processing II, Vol. 2182, pp. 88–397, San Jose, February 1994" is particularly suitable for 3D reconstruction in this application. Alternative techniques may also be used. For example, for applications such as 3D-photography with static objects, fewer cameras (or only one camera) may be used taking several pictures of the object by either fixing the camera and rotating the object on a turntable or by moving the camera around the object. For the latter, a tracking system is needed that gives the camera parameters. A suitable system for this is described in GB-A-2325807.

Figure 12:
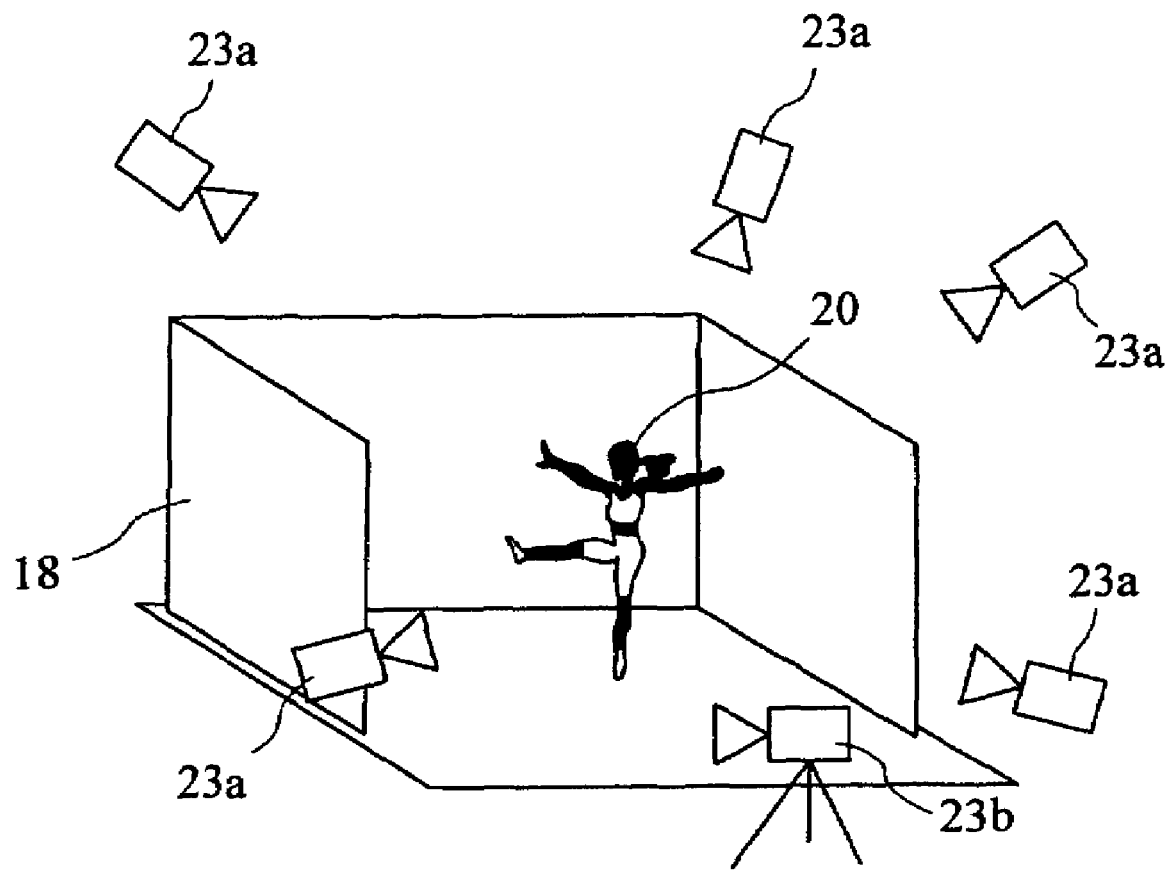
FIG. 12 is a perspective view depicting a typical studio arrangement.

Referring in particular to FIG. 12, an example of a multi-camera studio system with known parameters is illustrated. Details of such components are described in GB 2325807; GB 2321814 and U.K. patent application number 0206214.9, the disclosures of which are incorporated herein by reference.

The system depicted in FIG. 12 uses multiple cameras and chroma-key techniques to compute a 3D model of an actor 20. Studio cameras 23 are arranged to take images of the scene, including: at least one modified fixed camera 23a with an illuminator comprising a ring of blue LEDs for illuminating the object from the camera direction so that the retro-reflective background 18 reflects light back to the camera; and a similarly modified camera 23b with a tracking system.

Figure 3:
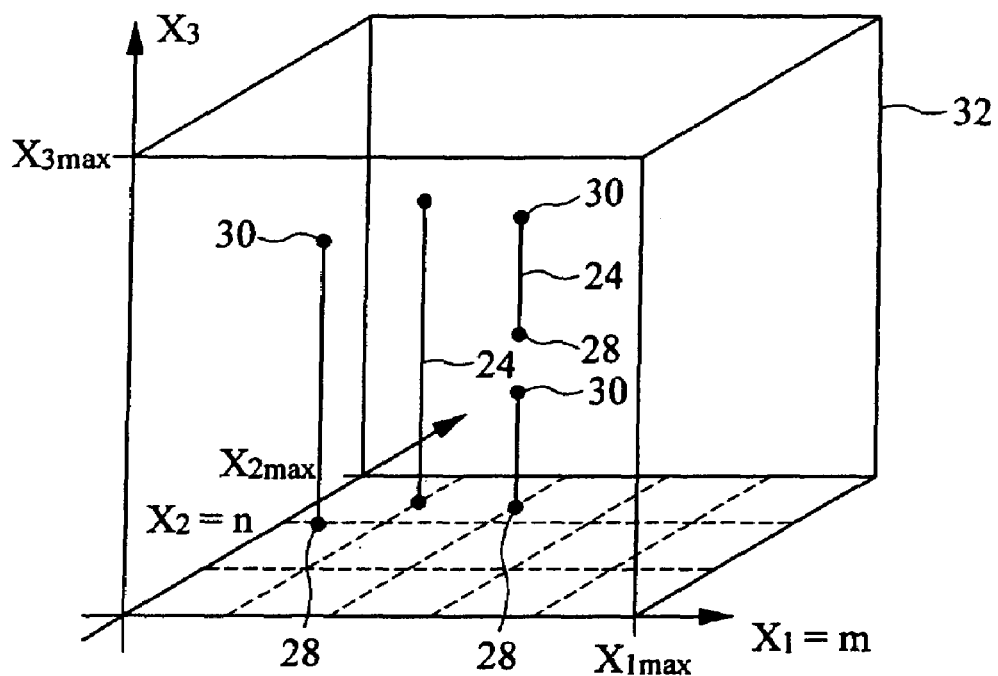
FIG. 3 is a schematic representation of a set of lines in accordance with the present invention.

The next step is that of obtaining a line list of points using a computer. This is achieved by sampling the object by a set of line segments 24, as illustrated in FIG. 3. For ease of calculation, the line segments 24 are organised into line segment sets S, organised in a 2D array. For example, the line segments 24 illustrated in FIG. 3 form a line segment set $S(x_1,x_2)$. The line segments 24 of this set extend from a base 26 defined by axes $x_1=m$ and $x_2=n$. The set $S(x_1,x_2)$ of segments 24 as illustrated in FIG. 3 is only able to sample the surface of an object correctly along the continuous axis, i.e. in the direction of the line segments 24, or along $x_3$. Also, $x_3=0$ to $x_3=x_{3max}$ is predetermined as being a length greater than the longest length of the object in the direction of $x_3$.

For each set, a list of line segments 24 is maintained for each position (m,n). As illustrated in FIG. 3, each position (m,n) may correspond to no line segments, or one or more line segments 24. Each line segment 24 is characterised by its start and end points 28 and 30 respectively.

The line segments 24 in a particular list assigned to position (m,n) lie on a line:

$$g(m,n): \vec{x} = \vec{x}_0 + \tau \vec{x}_d$$

Figure 4:
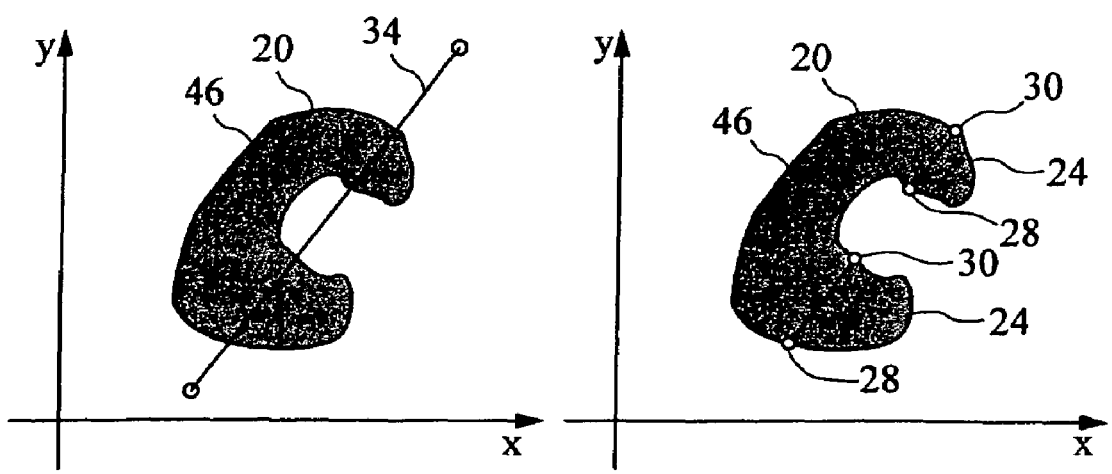
FIGS. 4, 5a–c and 8b are schematic representations of an application of line sets according to the present invention.
Figure 5:
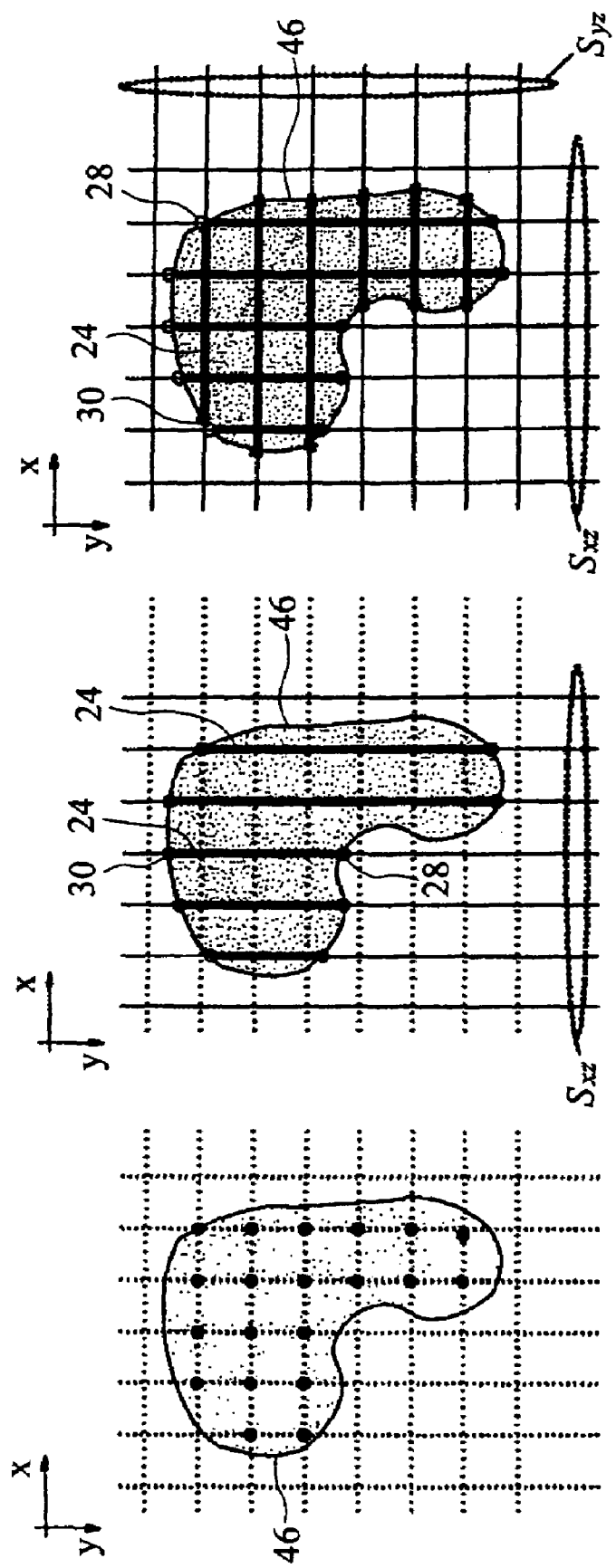

To initialise the process of performing the step of projecting line segments into the silhouette images, a volume 32 is defined to surround the object 20. In the initial stage of the process, the volume is considered as entirely populated with one initial line segment for each column (m; n) covering the definition range $0 \leq x_3 \leq x_{3max}$ of the volume. Referring for example to FIGS. 3 and 4, the entire algorithm for performing the step of projecting line segments into the silhouette images to determine the start and end points 28 and 30 for lines in each of the line sets is as follows:

1: Initialize a set S of major line segments $34 = (x_{3(0)}, x_{3max})$, for all silhouette images 22.
2: For all major line segments 34 in a given set S, project the major line segments 34 into one silhouetted object 36, where the projection is calculated with respect to the position of the camera that took the original image for silhouetted object 36 (in FIG. 4, the focal direction of the camera is normal to the x and y axes). The result is a 2D major line segment 34, with end points 28a and 30a.
3: For each major line segment 34, create a list of where the line 34 intersects with an edge or edges 22 of the silhouetted object 36. (NB: this list will be empty if the major line segment 34 does not pass through, or intersect, the silhouetted object 36).
4: Replace major line segments 34 in the given set S with corresponding line segments 24, in terms of their start and end points 28 and 30 contained in the list of step 3, which will be defined with respect to projection base 26.
5: Repeat steps 2 to 4 for remaining sets, where applicable.

Usually, the line segments will be orthogonal to their respective plane from which they are projected, in a local line segment coordinate system. For a projection base in the xy plane, and continuous axis along the z-axis, the line equations are:

$$g(m,n):(ms_x, ns_y, 0)^T + \tau(0,0,1)^T$$

where $s_x$ and $s_y$ are respective line spacings.

Therefore, as illustrated in FIGS. 5a–c, to sample an object correctly in all directions, three respective sets $S_{xy}$, $S_{yz}$ and $S_{xz}$ of line segments are extended for all three Euclidian axes (in FIG. 4a, set $S_{xy}$ is the set of line segments 24 going into or out of the x,y plane).

Therefore, the definition range for each line of the volume 32 in each of the Euclidian axes will be: for $S_{yz}$, $0 \leq x \leq x_{max}$; for $S_{xz}$, $0 \leq y \leq y_{max}$; and for $S_{xy}$, $0 \leq z \leq z_{max}$.

In such an embodiment the next stage of the method involves obtaining an approximate volumetric representation of the object using a computer. A suitable form of this stage of the method is using the marching cubes procedure, or algorithm, as discussed above. As will be appreciated by persons skilled in the art, other algorithms, or procedures may be used to obtain the approximate volumetric representation of the object in alternative embodiments. For example, a marching triangles procedure may by used ("'Marching Triangles: Range Image Fusion for Complex Object Modeling" Hilton, 1., Stoddart, A. J., Ilingworth, J. and Windeatt, T. IEEE 1996 International Conference on Image Processing'.)

Figure 6:
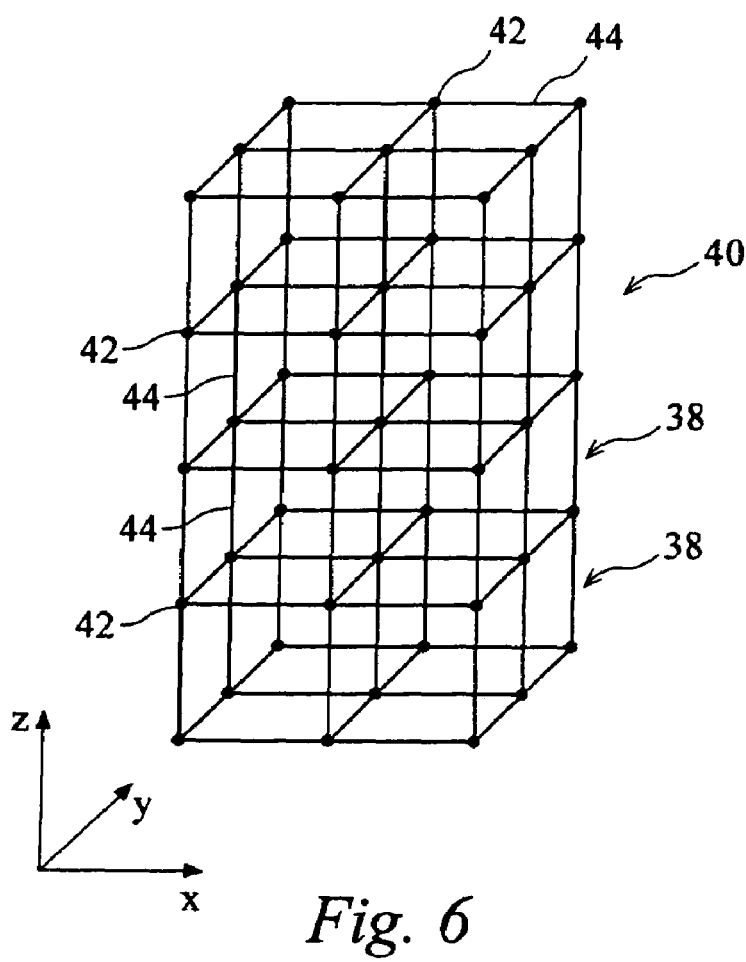
FIG. 6 is an array of voxels.

The marching cubes algorithm uses an array of voxels 38 in a defined space that is predetermined to fit the object therein. An example of a voxel array 40 is illustrated in FIG. 6, where eight vertices 42 define each voxel 38. In turn, each adjacent pair of vertices 42 defines a voxel edge 44 therebetween (see FIG. 7).

The silhouette images 22 can then be thought of as being projected into the voxels' space, or vice versa. It is then determined in which of the voxels 38 the object 20 is present, and through which of the voxels an edge 46 of the object 20 passes. For the purpose of the specification, these latter voxels are termed "intersected voxels". It is also determined through which of the voxel edges 44 the object edge 46 intersects.

A list of the intersected voxels and their intersected edges (in terms of the voxel vertices 42 which define the respective voxel edge 44) is then compiled. This data is run through the remainder of the marching cubes algorithm, which firstly assumes the object edge 46 passes through a midpoint 48 of the voxel edge 44, and then reads a look-up table of fifteen variations of triangles having their vertices at the voxel edge midpoints 48 between adjacent voxel vertices and assigns one or two appropriate triangles to the given intersected voxel. For example, using the illustration of the voxel 38 illustrated in FIG. 7, an edge of an object has passed between voxel vertices 42a–d, or through voxel edges 44a–c. Although the object edge 46 may have intersected edges 44a–c at any point along the edges, the marching cubes algorithm assigns this voxel a triangle 50 with vertices 52 at edge midpoints 48.

Figure 7:
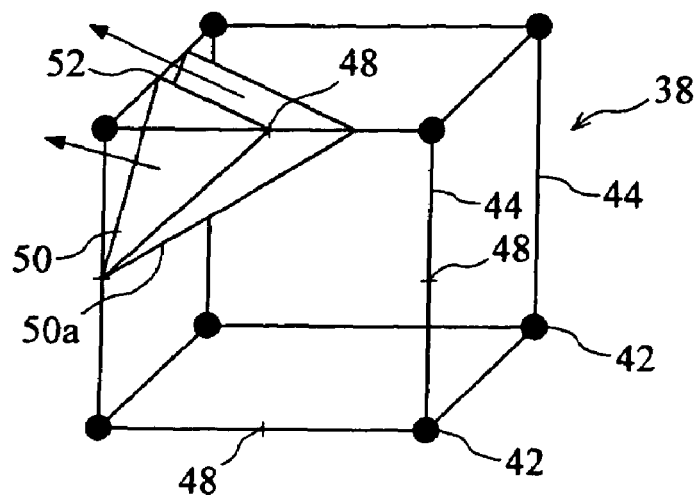
FIG. 7 is a single voxel.

In the usual marching cubes procedure, the triangles 50 which make up the volumetric representation have their vertices at respective voxel edge midpoints 48. However, in such an embodiment, data from the line segment sets S is used to determine, where appropriate, where on the intersected voxels' edges the object edge 46 actually passes. That is to say, when calculating the triangle to be used in a particular intersected voxel, the positions of the triangle vertices 52 are retrieved from the line segment sets with the same orientation as the particular voxel edges 44 and are therefore based on a measured value, rather than a mere discrete value, as is the case with the marching cubes algorithm. For example, FIG. 7 illustrates the triangle 50 produced by the marching cubes algorithm, with midpoint vertices 52, whereas triangle 50a, corresponding to triangle 50, has vertices 52 at points not necessarily being voxel edge midpoints 48.

Figures 8A, 8B:
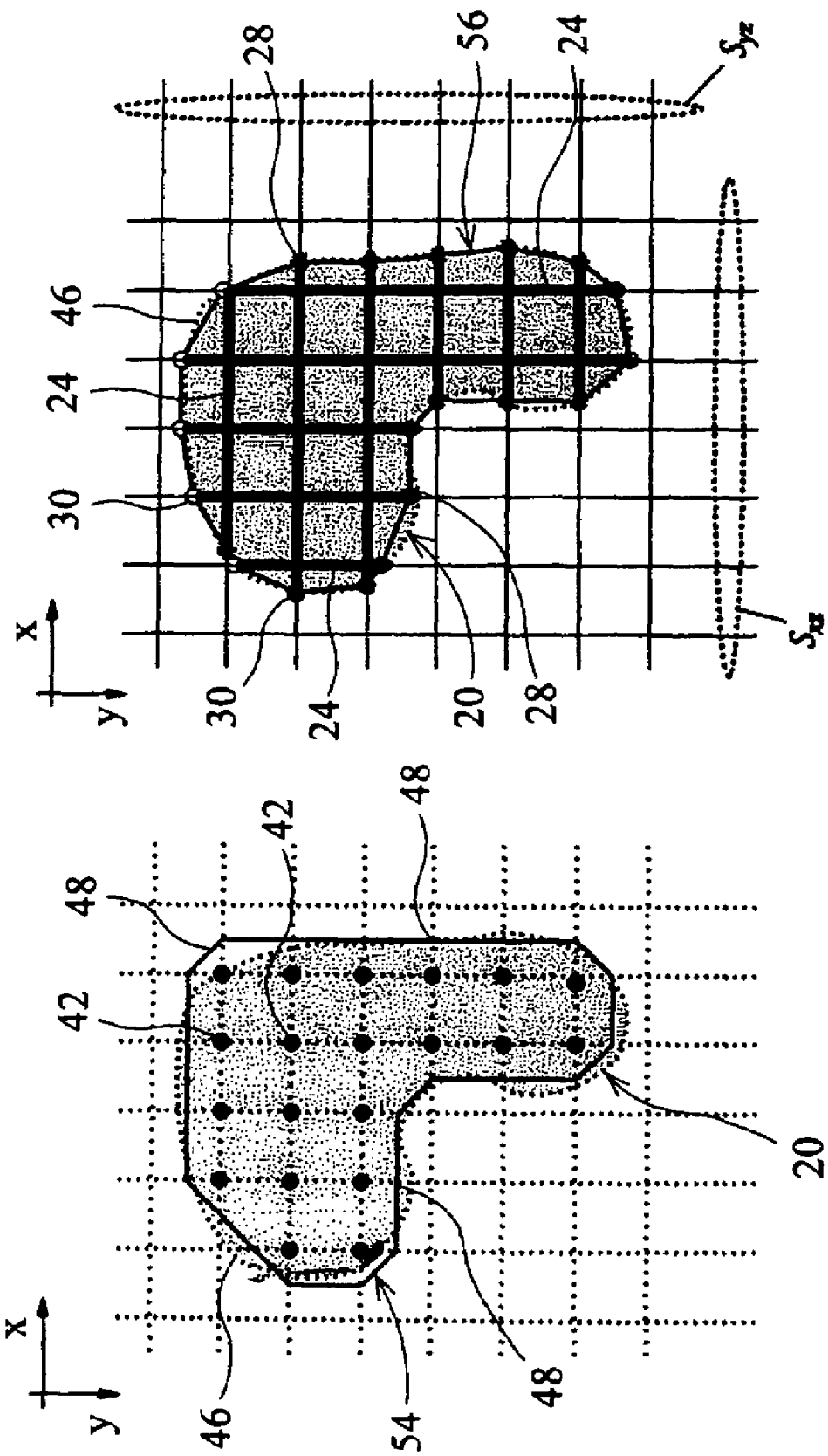
FIG. 8a is a schematic representation of an application of a prior art method.

A comparison of the outcome of using the marching cubes algorithm compared with the method of the present invention is illustrated in FIGS. 8a & b, 9 and 10. FIG. 8a illustrates the outcome of the marching cubes algorithm in one plane, of the object 20 illustrated in FIGS. 5a–c. As is illustrated, voxel vertices 42 shown in bold are deemed within the object 20. Also, the edge 44a of the marching cubes representation 54 passes through voxel edge midpoints 48. FIG. 8b illustrates the use of two line sets Sxz and Syz which have been projected through plane xy, determining start and end points 28 and 30 of the line segments 24. These start and end points 28 and 30 show how the resultant representation 56 is a more accurate representation than when produced by the marching cubes algorithm alone.

Figure 10:
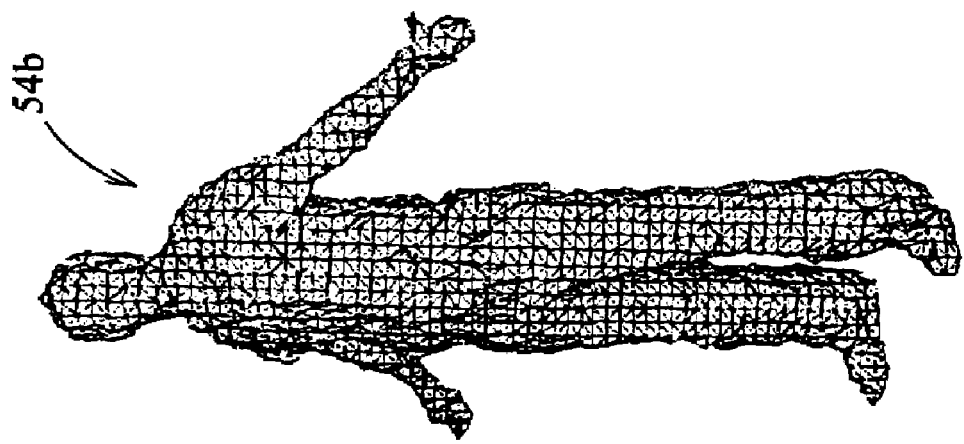
FIG. 10 is an example of a volumetric representation of an object using the present invention.
Figure 9:
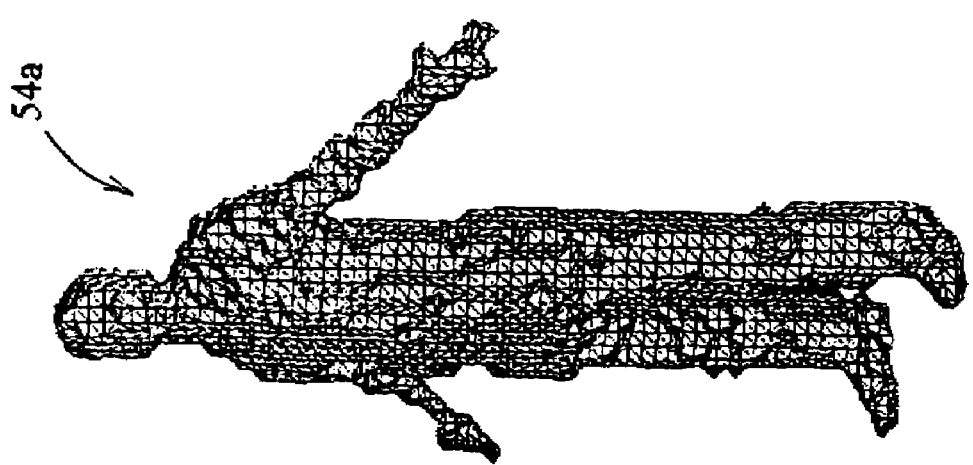
FIG. 9 is an example of a volumetric representation of an object using the marching cubes algorithm.

FIG. 9 represents a marching cubes volumetric representation 54a of the object 20 in FIG. 1, and FIG. 10 represents a volumetric representation 54b using the method of the present invention of the same object. On comparison of FIGS. 9 and 10, it is apparent that the method of the present invention has produced a more accurate representation of the object 20.

The advantages of the present invention over the prior art are therefore quite clear to the skilled person. That is to say, utilising the method of the present invention results in a volumetric representation of improved accuracy when compared with prior art methods, while at the same time the volumetric representation is defined by a relatively small data set. Also, the data set does not contain discrete information about the shape of the object, but continuous data. Therefore, real information about the object is not lost during use of the method, as it would be when using prior art methods.

Figure 11:
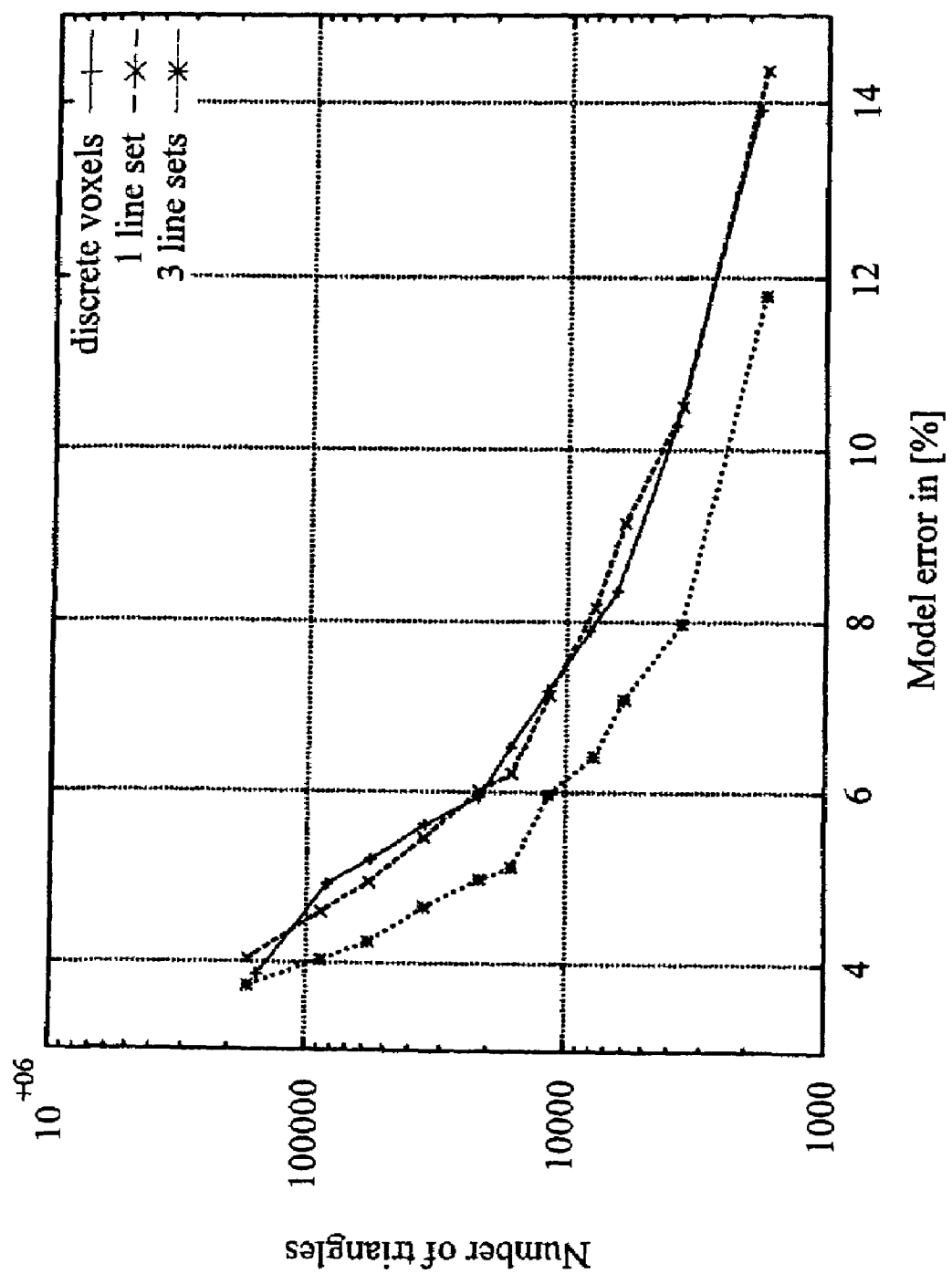
FIG. 11 is a graph displaying error comparisons of different models of methods for obtaining a volumetric representation of an object.

In FIG. 11 the number of triangles is shown over the measured model silhouette error. For the determination of the error the computed 3D volumetric representation is projected into the original image. The silhouette error is then computed as the ratio between the number of pixels where the model is incorrect and the total number of pixels of the real object silhouette. The required number of triangles which is controlled by increasing or decreasing the voxel size of the volumetric data set is depicted for three methods: using discrete voxels; using a line segment set in just one direction and for 3 line segment sets. For a silhouette error of approximately 8% the prior art approach needs 8144 triangles. Our 3-line segment set approach needs only 3586 triangles. The 1-line segment set approach is only occasionally better than the prior art approach because it gains only in one direction from the line segment representation and introduces the same quantisation noise as the prior art method in the other directions. The computation for the 3D polygon models with an error of 8% needs 1.45 seconds for the conventional methods, 0.49 seconds for the 1 line segment set S and 0.52 seconds for three line segment sets, on a computer using a Linux® operating system with a Pentium® IV Xeon® processor, running at 2.2 GHz.

Furthermore, texture maps can be applied to the outcome of the method of the present invention to render a more realistic representation of the object 20.

It will be appreciated by the skilled person that in alternative embodiments of the present invention, alternative methods to the marching cubes algorithm are employed for the step of obtaining a volumetric representation of the object.

Also, another embodiment of the present invention provides a moving volumetric representation of the object. In this embodiment a plurality of volumetric representations of the three-dimensional object 20 are obtained using the method of the first described embodiment, where each volumetric representation represents a different phase of movement of the object 20 over time. To provide the moving volumetric representation, the volumetric representations are displayed, usually on a computer, over time to produce to a viewer the sensation that the volumetric representation of the object is moving.

Another embodiment of the invention provides a system for providing a volumetric representation of a three dimensional object 20. The system comprises means for obtaining silhouette images of the object, the means being in the form of a camera and conventional chroma-key imaging equipment. The system also includes means for obtaining a line list of points of at least one set of lines having start and end points corresponding to intersection of the lines with object boundary positions; means for obtaining an approximate volumetric representation of the object; and means for producing a modified volumetric representation based on the start and end points of the set of lines. These means are in the form of a computer with software to process the line list, and obtain an approximate representation, according to the methods described above. Usually, the chroma-key imaging equipment is capable of providing digital information of the silhouette images 22 to the computer with software to process the line list. However, where the chroma-key imaging equipment only produces a printed copy of the silhouette images, these images are scanned using a conventional scanner to provide the digital information of the silhouette images 22.

In an alternative embodiment, rather than modifying an approximate volumetric representation, the start and end points of the lines may be used to form a continuous surface. This may be achieved by beginning with one of the start or end points and searching for adjacent, or neighboring points to form a polygon. A 3D search may be performed, but an advantage of this method is that, because the lines are arranged in 2D grids, a more efficient 2D neighboring point search may be performed. In a 2D search, the search along two grid axes in the plane of the grid may be used to locate the 3D coordinates of the neighboring start or end point. For example, with reference to FIG. 3, A search along the x1,x2 axes will enable start and end points of the lines to be correlated into lower and upper bounding triangles. Typically, three points will be correlated, or joined to form triangles, but polygons with more than three vertices may also be formed. The process is iterated over all available start and end points to form the volumetric representation. Although a 2D search may be performed within grids, a 3D search may be necessary at the edge of each grid.

While the present invention has been described by way of suitable embodiments, it is to be understood that the words which have been used are words of description rather than limitation and that changes may be made to the invention without departing from its scope as defined by the appended claims.

Each feature disclosed in this specification (which term includes the claims) and/or shown in the drawings may be incorporated in the invention independently of other disclosed and/or illustrated features.

The text of the abstract filed herewith is repeated here as part of the specification.

The invention provides a method of providing a volumetric representation of a three-dimensional object. The method comprises several steps, including obtaining a line list of points of at least one set of lines having start and end points corresponding to intersection of the lines with object boundary positions and obtaining an approximate volumetric representation of the object. Then, a modified volumetric representation is produced by modifying the approximate volumetric representation based on the start and end points of the set of lines and the approximate volumetric representation. The resultant modified volumetric representation of the object is more accurate than the approximate volumetric representation of the object. Also, a resultant data set from the present invention that defines the volumetric representation of the object contains continuous data as to the shape of the object, rather than mere discrete data. Therefore, the resultant data set contains more realistic data defining the object.

The invention claimed is:

1. A computer-implemented method of modifying an approximate volumetric representation of a three-dimensional object, the method comprising:
   obtaining a line list of points of at least one set of lines having start and end points corresponding to intersection of the lines with object boundary positions, said sets of lines having components extending in three orthogonal directions;
   producing a modified volumetric representation by modifying the approximate volumetric representation based on the start and end points of the set of lines and the approximate volumetric representation; and displaying the modified volumetric representation.

2. The method of claim 1 wherein at least two two-dimensional images of the object are obtained and the object boundary positions are defined by edges of the object in the at least two two-dimensional images.

3. The method of claim 2 wherein the at least one set of lines is projected into at least one of the images to determine which of the lines intersect the edges.

4. The method of claim 3 wherein the line list of points is determined by the points where the lines intersect the edges.

5. The method of claim 4 wherein the set of points are start and end points of line segments of the lines that intersect the edges.

6. The method of claim 5 wherein the approximate volumetric representation is obtained by projecting the at least two images of the object into an array of voxels, determining in which of the voxel(s) one or more of the edge(s) of the object intersects therewith, and producing a voxel list thereof.

7. The method of claim 6 wherein the line list(s) are used to determine at least some locations on voxel edges of respective voxels in the voxel list to produce a voxel edge intersection list, and wherein the voxel edge intersection list is used to produce the modified volumetric representation.

8. The method of claim 6 wherein the start and end points of the line segments are used to determine at least some locations on voxel edges of respective voxels in the voxel list to produce a voxel edge intersection list, and wherein the voxel edge intersection list is used to produce the modified volumetric representation.

9. The method of claim 1 wherein the modified volumetric representation is produced to have at least some voxel edges which more accurately match object edges than in the approximate representation.

10. The method of claim 1 wherein the approximate volumetric representation is obtained using a marching cubes procedure.

11. The method of claim 10 wherein the start and end points are used to modify the spatial positions of triangle vertices of triangles produced by the marching cubes procedure on the triangle vertices' respective voxel edges.

12. The method of claim 2 wherein the images are produced from a chroma-key process.

13. The method of claim 12 wherein the initial images are obtained using one or more cameras in a studio, which studio may include a retroreflective background behind the object.

14. The method of claim 5 wherein the start and end points and the position and direction of the lines are estimated with respect to a position of a camera when obtaining the images.

15. The method of claim 5 including receiving and/or storing and/or dynamically obtaining a plurality of measures of camera positions.

16. The method of claim 12 including 3 pairs of images, wherein the images of each pair lie in a parallel plane, and the plane of each respective image of each pair is normal to the planes of the remaining pairs.

17. The method of claim 1 wherein a texture map is applied to the volumetric representation.

18. The method of claim 1, wherein said line lists of points comprise continuous data values.

19. The method of claim 2 wherein the approximate volumetric representation is obtained by projecting the at least two images of the object into an array of voxels, determining in which of the voxel(s) one or more of the edge(s) of the object intersects therewith, and producing a voxel list thereof.

20. A computer-implemented method for providing a moving volumetric representation of an object, the method comprising obtaining a plurality of volumetric representations of a three-dimensional object where each volumetric representation represents a different phase of movement of the object over time, by obtaining a line list of points of at least one set of lines having start and end points corresponding to intersection of the lines with object boundary positions; obtaining an approximate volumetric representation of the object; and producing a modified volumetric representation by modifying the approximate volumetric representation based on the start and end points of the set of lines and the approximate volumetric representation,; and consecutively displaying each volumetric representation in a manner to produce to a viewer the sensation that the volumetric representation of the object is moving.

21. A system for providing a volumetric representation of a three dimensional object, the system comprising:
means for obtaining an approximate volumetric representation of the object;
means for obtaining a line list of points of at least one set of lines having start and end points corresponding to intersection of the lines with object boundary positions;
means for storing the line list of points; and
means for producing a modified volumetric representation based on the start and end points of the set of lines.

22. The system of claim 21 including means for obtaining at least two two-dimensional images of the object and the object boundary positions are defined by edges of the object in the at least two two-dimensional images.

23. The system of claim 22 including means for projecting the at least one set of lines into at least one of the images to determine which of the lines intersect the edges.

24. The system of claim 22 wherein the means for obtaining is at least one camera.

25. The system of claim 24 comprising means for receiving and/or storing a plurality of measures of positions of the at least one camera.

26. A computer program stored on a computer readable medium for providing a plurality of volumetric representations of 3D object, each volumetric representation representing a different phrase of movement of the object over time, comprising instructions for obtaining a line list of points of at least one set of lines having start and end points corresponding to intersection of the lines with object boundary positions; obtaining an approximate volumetric representation of the object; producing a modified volumetric representation by modifying the approximate volumetric representation based on the start and end points of the set of lines and the approximate volumetric representation and consecutively displaying each volumetric representation in a manner to produce to a viewer the sensation that the volumetric representation of the object is moving.

* * * * *